(12) United States Patent
Emori

(10) Patent No.: US 8,131,990 B2
(45) Date of Patent: Mar. 6, 2012

(54) DATA PROCESSING APPARATUS AND METHOD OF MOUNTING LOGICAL DRIVE

(75) Inventor: Ryota Emori, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 674 days.

(21) Appl. No.: 12/259,027

(22) Filed: Oct. 27, 2008

(65) Prior Publication Data

US 2009/0193246 A1      Jul. 30, 2009

(30) Foreign Application Priority Data

Jan. 28, 2008   (JP) ................ 2008-016140

(51) Int. Cl.
*G06F 9/00* (2006.01)
*G06F 9/24* (2006.01)
*G06F 15/177* (2006.01)
*G01C 21/00* (2006.01)

(52) U.S. Cl. .............. 713/100; 713/1; 713/2; 701/200

(58) Field of Classification Search .................. None
See application file for complete search history.

(56) References Cited

U.S. PATENT DOCUMENTS

| | | | |
|---|---|---|---|
| 6,654,881 B2 | 11/2003 | Cabrera et al. | |
| 7,949,865 B1 * | 5/2011 | Yadav .................. | 713/1 |
| 2006/0259688 A1 * | 11/2006 | Deicke et al. ................ | 711/115 |
| 2007/0079062 A1 * | 4/2007 | Miyawaki et al. ........... | 711/112 |
| 2008/0046610 A1 * | 2/2008 | Tripathi et al. ................ | 710/36 |
| 2008/0172542 A1 * | 7/2008 | Kaushik ...................... | 711/202 |

FOREIGN PATENT DOCUMENTS

JP   2006-039809   2/2006

OTHER PUBLICATIONS

The Linux Information Project, "Mounting Definition", Mar. 9, 2006, retrieved from the World Wide Web, http://www.linfo.org/mounting.html.*

* cited by examiner

*Primary Examiner* — Ji H Bae
(74) *Attorney, Agent, or Firm* — Brinks Hofer Gilson & Lione

(57) ABSTRACT

A data processing apparatus and a method of mounting a logical drive are provided which reduce the time required for completing start-up of an application. A priority level of each logical drive is determined based on access frequency by the automatically started applications in an initial setting processing of the applications in the previous start-up of the data processing apparatus. Higher priority is given to the logical drive having higher access frequency. For subsequently starting up the data processing apparatus, each logical drive is mounted in the order of the determined priority.

20 Claims, 6 Drawing Sheets

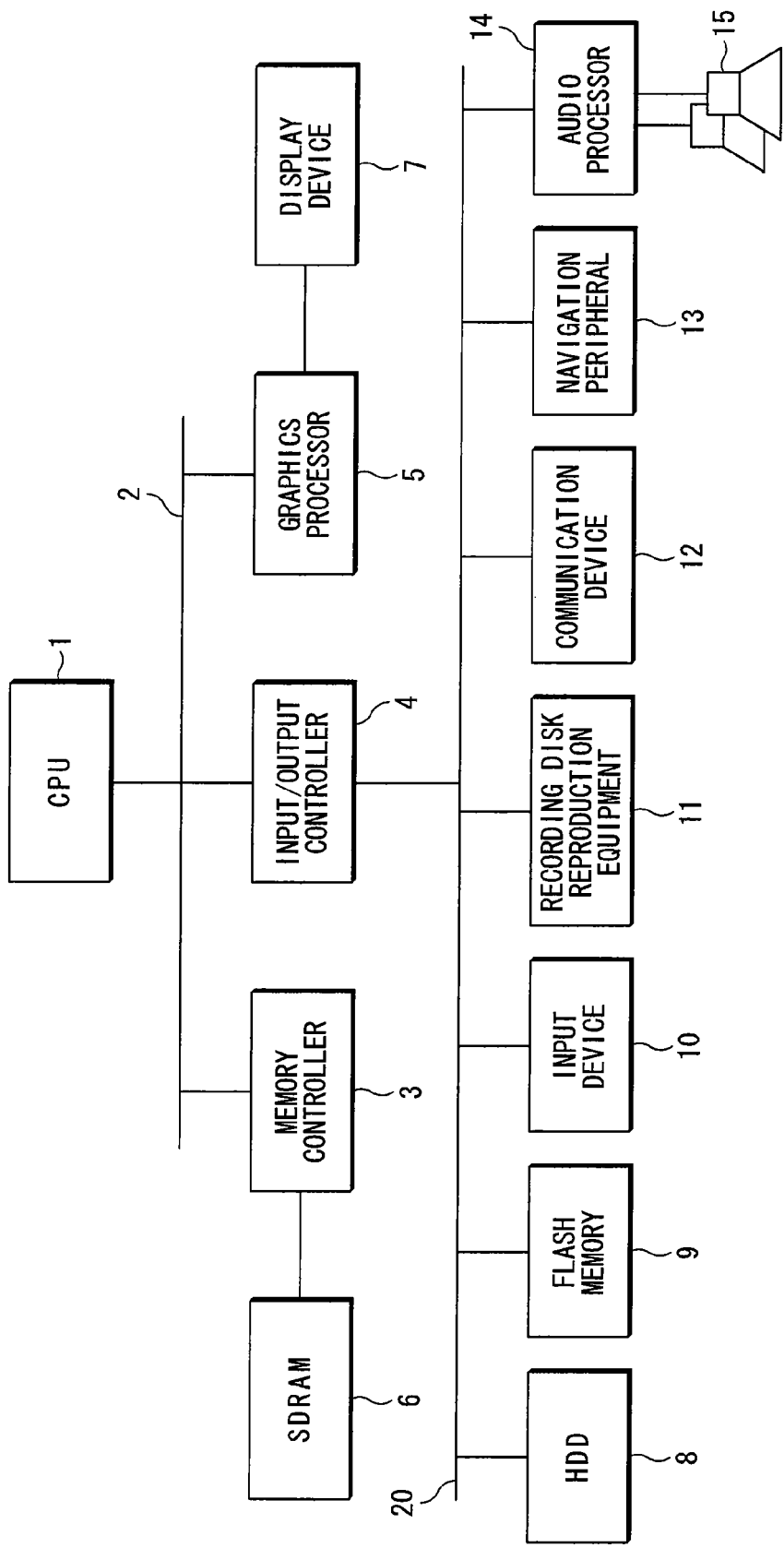

FLASH MEMORY

| LOGICAL DRIVE (PARTITION) | RECORDED DATA | USED APPLICATION | ACCESS IN INITIAL SETTING |
|---|---|---|---|
| #1 | MAP DATA | NAVIGATION | PRESENT |
|  | CDDB | AUDIO | ABSENT |
| #2 | AUDIO FILE | AUDIO | PRESENT |
|  | TELEPHONE BOOK DATA | TELEMATICS | PRESENT |
| #3 | MAINTENANCE DATA |  | ABSENT |
| #4 | SHARED RESOURCE DATA | SHARED USE | PRESENT |
| #5 | NAVIGATION STATE DATA | NAVIGATION | PRESENT |

HDD

FIG.3(a)

| LOGICAL DRIVE (PARTITION) | PRIORITY |
|---|---|
| #1 | 1 |
| #2 | 4 |
| #3 | 5 |
| #4 | 2 |
| #5 | 3 |

MOUNT PRIORITY TABLE

FIG.3(b)

| LOGICAL DRIVE (PARTITION) | ACCESS ORIGIN | ACCESS FREQUENCY |
|---|---|---|
| #1 | NAVIGATION | 130 |
| #1 | AUDIO | 0 |
| #1 | TELEMATICS | 0 |
| #2 | NAVIGATION | 0 |
| #2 | AUDIO | 5 |
| #2 | TELEMATICS | 4 |
| #3 | NAVIGATION | 0 |
| #3 | AUDIO | 0 |
| #3 | TELEMATICS | 0 |
| #4 | NAVIGATION | 42 |
| #4 | AUDIO | 24 |
| #4 | TELEMATICS | 32 |
| #5 | NAVIGATION | 18 |
| #5 | AUDIO | 0 |
| #5 | TELEMATICS | 0 |

ACCESS MANAGEMENT TABLE

FIG.3(c)

| APPLICATION | TIME LENGTH |
|---|---|
| NAVIGATION | 5.043sec |
| AUDIO | 3.255sec |
| TELEMATICS | 1.455sec |

INITIAL SETTING PROCESSING TIME LENGTH MANEGEMENT TABLE

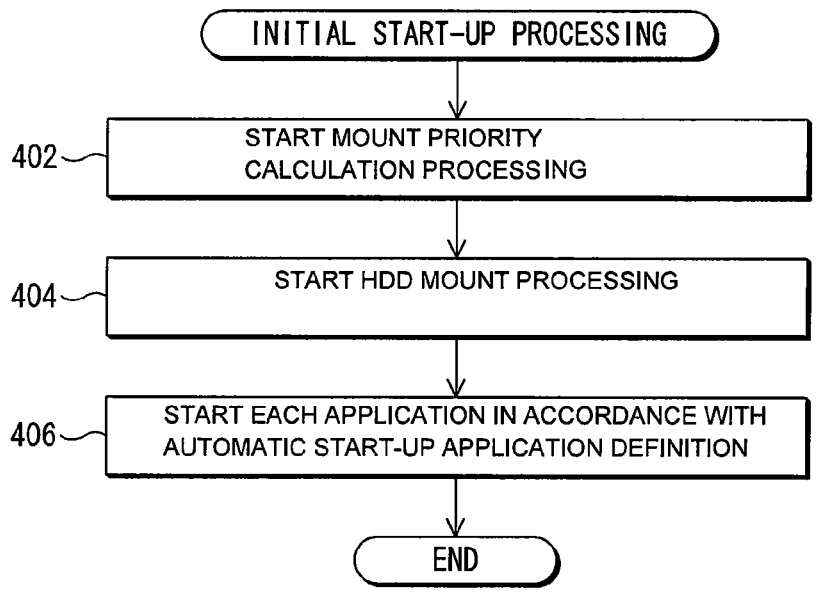
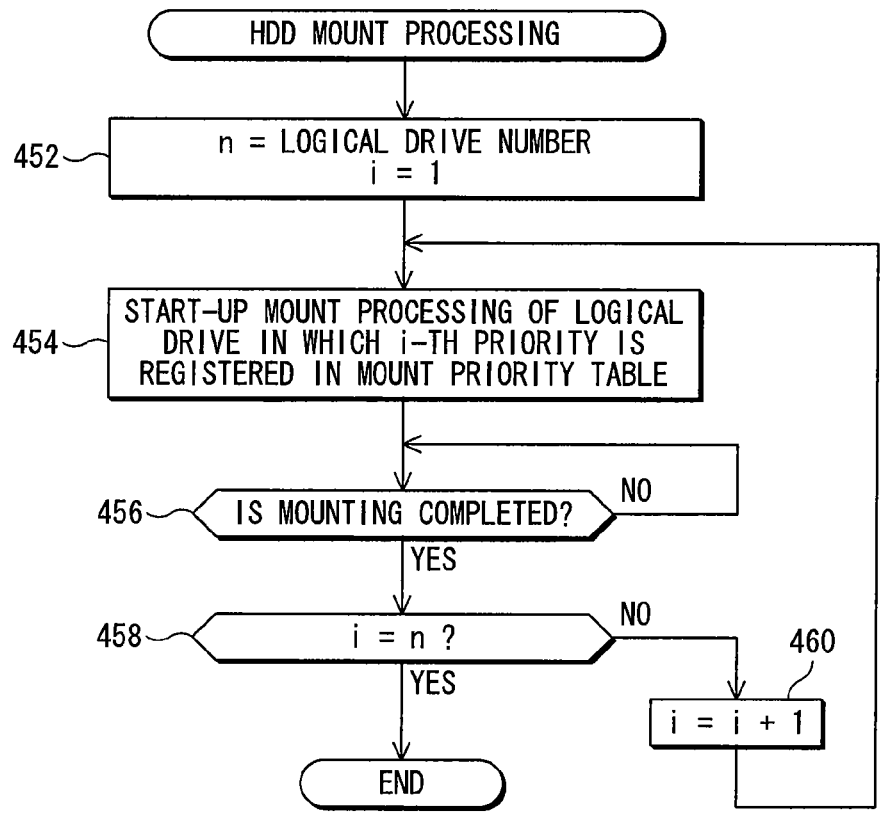

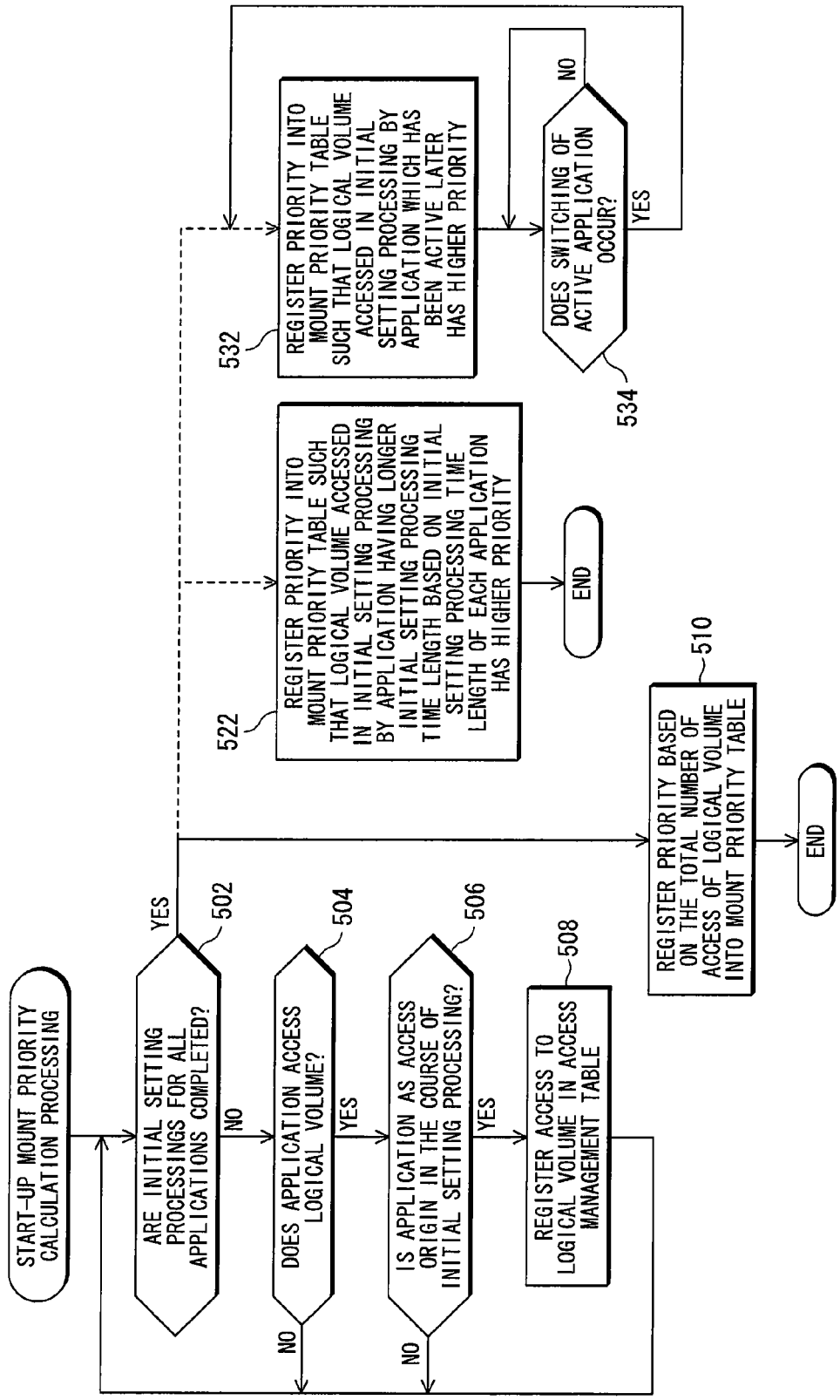

DATA PROCESSING APPARATUS AND METHOD OF MOUNTING LOGICAL DRIVE

RELATED APPLICATIONS

The present application claims priority to Japanese Patent Application Number 2008-016140, filed Jan. 28, 2008, the entirety of which is hereby incorporated by reference.

BACKGROUND OF THE INVENTION

1. Field of the Invention

The present invention relates mainly to a technique for mounting, on a data processing apparatus executing an application, a drive in which data used by the application is stored.

2. Description of the Related Art

As a technique for mounting a drive in which data used by an application is stored, there is known a technique for storing, in a nonvolatile semiconductor memory device such as a flash memory, start-up information required for mounting the drive such as a file system stored in the drive; and for mounting the drive using the start-up information stored in the nonvolatile semiconductor memory device (see, e.g., Japanese Patent Application Publication No. 2006-39809).

SUMMARY OF THE INVENTION

When there exists a plurality of high-capacity drives in which data used by an application is stored, a long time is required in some cases for completing the mounting of all the drives even with the technique of Japanese Patent Application Publication No. 2006-39809. Further, the application using data stored in the drive in start-up cannot read the data until mounting of the drive is completed. Therefore, requiring a long time for completing the mounting of all the drives can mean requiring a long time until start-up of such an application.

Accordingly, it is an object of the present invention to mount a drive in which data used by an application is stored so as to reduce the time required for completing the start-up of the application.

To accomplish the above-described object, the present invention provides a data processing apparatus for mounting a plurality of logical drives and executing an application using data stored in the logical drives comprising a priority setting section for setting a priority of each logical drive such that a logical drive accessed by an application automatically started in the start-up of the data processing apparatus in the initial setting processing of the application has higher priority; and a mount processor for mounting, in the start-up of the data processing apparatus, each logical drive in the order of the set priority.

According to the data processing apparatus, the logical drive accessed by the application automatically started in start-up of the data processing apparatus in the initial setting processing of the application is mounted first. Therefore, the time length required for completing the initial setting processing of the application is reduced and start-up of the application is completed sooner.

According to the data processing apparatus, the priority setting section may set a priority of each logical drive such that the logical drive having higher access frequency by the automatically started application in the initial setting processing of the application has higher priority.

As described above, the length of time required for completing the start-up of an application automatically started in start-up of the data processing apparatus is effectively reduced.

Alternatively, according to the above-described data processing apparatus, the priority setting section may set a priority of each logical drive based on a length of time required for the initial setting processing of the automatically started application, such that a logical drive accessed by an application requiring a longer time for the initial setting processing in the initial setting processing of the application has higher priority.

Thus, the length of time required for completing the start-up of the automatically started applications in start-up of the data processing apparatus is reduced.

According to the data processing apparatus, the priority setting section may set a priority of each logical drive such that a logical drive accessed by the application last used by a user from among the automatically started applications in the initial setting processing of the application has higher priority than the other drives.

As described above, start-up of the application last used by a user from among the automatically started application is completed early. As a result, a user can use the application immediately after start-up of the data processing apparatus.

According to the data processing apparatus, partitions of the HDD may be used as the plurality of logical drives. Further, the data processing apparatus may include an application for causing the data processing apparatus to function as a car navigation system as the automatically started application mounted in a vehicle.

Therefore, according to the present invention, the drive in which data used by the application is stored can be mounted so as to reduce the length of time required for completing the start-up of the application.

BRIEF DESCRIPTION OF THE DRAWINGS

FIG. 1 is a block diagram showing a structure of a data processing apparatus according to an embodiment of the present invention.

FIGS. 3(a) to 3(c) show tables used by the data processing apparatus according to the embodiment of the present invention.

FIGS. 4(a) and 4(b) are flowcharts showing an initial start-up processing and an HDD mount processing according to the embodiment of the present invention.

FIG. 5 is a flowchart showing a mount priority calculation processing according to the embodiment of the present invention.

DETAILED DESCRIPTION OF EMBODIMENTS OF THE INVENTION

Figures 2A, 2B:
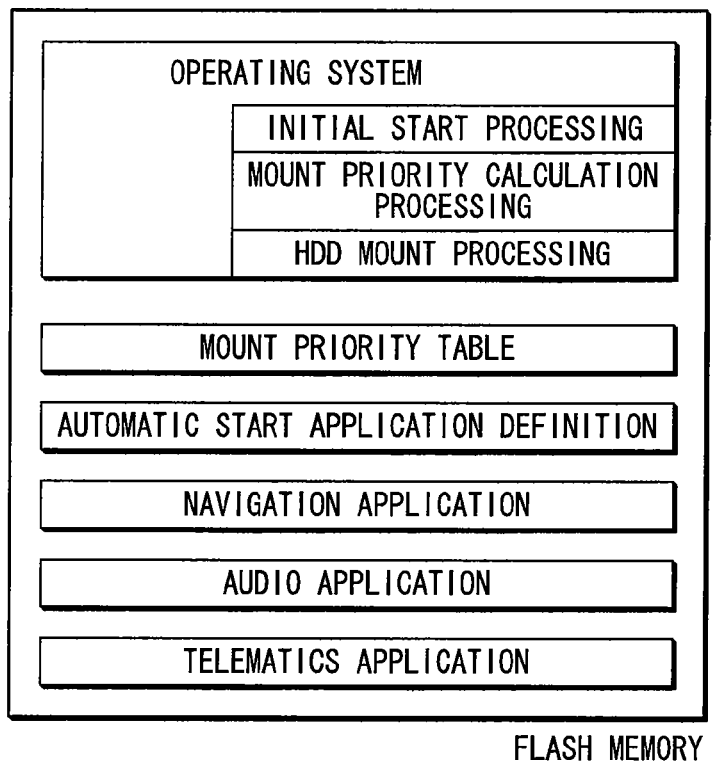
FIGS. 2(a) and 2(b) show storage contents of a flash memory and an HDD provided with the data processing apparatus according to an embodiment of the present invention.

Now a preferred embodiment of the present invention is described.

FIG. 1 shows a structure of a data processing apparatus according to one embodiment of the present invention.

As shown in the drawing, the data processing apparatus is an on-vehicle system mounted in a vehicle and has the basic structure of a computer. Specifically, the data processing apparatus comprises a CPU 1, a memory controller 3, input/output controller 4, and graphics processor 5 connected to the CPU 1 via a high speed bus 2. Further, the data processing apparatus comprises a SDRAM 6 in which a read/write and an input/output via the high speed bus 2 are controlled by the memory controller 3, and a display device 7 in which images are produced by the graphics processor 5. Further, the data processing apparatus comprises an HDD 8, flash memory 9, input device 10, recording disk reproduction equipment 11, communication device 12, navigation peripheral 13, and audio processor 14 connected to the input/output controller 4 via a low speed bus 20.

The input/output controller 4 relays an input and output between the low speed bus 20 and the high speed bus 2. The HDD 8, flash memory 9, input device 10, recording disk reproduction equipment 11, communication device 12, navigation peripheral 13 and audio processor 14 perform an input and output with the CPU 1 via the low speed bus 20, the input/output controller 4 and the high speed bus 2.

The recording disk reproduction equipment 11 is a reproducing device such as a CD drive or DVD drive for reproducing a disk such as a CD and DVD. The communication device 12 is, for example, a radio communication device such as a mobile phone for performing communication via a mobile phone network. The navigation peripheral 13 is a sensor for detecting various states of the vehicle, such as a GPS receiver for performing satellite positioning, a vehicle speed sensor and a direction sensor. The audio processor 14 is a device for performing output of audio data to the speaker 15.

In the above-described structure, the flash memory 9 is a nonvolatile semiconductor memory device that stores programs such as an operating system, a navigation application, an audio application, a telematics application, a mount priority table, and an automatic start application definition as shown in FIG. 2(a). Further, the operating system includes as a library an initial start-up processing, a mount priority calculation processing, and an HDD mount processing.

The HDD 8 is divided into five partitions #1 to #5 as shown in FIG. 2(b), and each partition is mounted on the data processing apparatus as a logical drive. Further, the data processing apparatus may include a plurality of the HDDs 8, and the above-described five partitions may be arranged in the different HDDs 8. Alternatively, a part of the plurality of the HDDs 8 may be a portable HDD 8 connected detachably to the data processing apparatus.

In the partition #1, map data used by the navigation application and CDDB used by the audio application are stored. In the partition #2, an audio file used by the audio application and telephone book data used by the telematics application are stored. In the partition #3, maintenance data not directly used by the above-described applications, such as backup data are stored. In the partition #4, shared resource data such as images shared for building a GUI by the above-described applications are stored. In the partition #5, navigation state data used by the navigation application are stored.

Now, the processing performed by the navigation application is described. The GUI of the display device 7 and the input device 10 for the input/output to/from a user is built and provided from a shared resource stored in the HDD 8. Further, using the navigation peripheral 13 and the map data stored in the HDD 8, the vehicle position is calculated and a route from the vehicle position to a destination identified by the user on the GUI is calculated. Furthermore, the calculated vehicle position and route are shown on the map displayed on the display device 7.

The navigation state data stored in the HDD 8 is data stored by the navigation application and shows a present position calculated by the navigation application and a present guide state using the navigation application.

Now the processing performed by the audio application will be described. The GUI of the display device 7 and the input device 10 for the input/output to/from a user is built and provided from a shared resource stored in the HDD 8. Further, in response to a user operation on the GUI, the audio files stored in the HDD 8 and the audio tracks stored in the disk mounted on the recording disk reproduction equipment 11 are read out, and audio data in the audio files and audio tracks are reproduced from the speaker 15 via the audio processor 14. Furthermore, the audio data of musical pieces is read out from the disk by means of the recording disk reproduction equipment 11 and recorded in the HDD 8 associated with attribute information such as titles and artists of musical pieces searched from the CDDB stored in the HDD 8.

The processing performed by the telematics application will now be described. The GUI of the display device 7 and the input device 10 for the input/output to/from a user is built and provided from a shared resource stored in the HDD 8. Further, in response to a user operation on the GUI, a phone number registered in the telephone book data stored in the HDD 8 is called via the communication device 12 to establish communication with a person at the phone number, and various data and speech are transmitted/received to/from the person.

In the mount priority table stored in the flash memory 9, the priority of each of the logical drives corresponding to each partition in the HDD 8 is registered as shown in FIG. 3(a). A processing for this registration will be described later.

The start-up operation of the above-described data processing apparatus is now described.

When the data processing apparatus is turned-on, the CPU 1 executes a previously determined initial program, loads contents of the flash memory 9 into the SDRAM 6, and starts execution of an operating system program. Thereby, the CPU 1 starts up the operating system. In addition, the initial program may be stored either in the flash memory 9 or in a separately provided ROM.

When a predetermined initial setting processing is completed, the started operating system executes an initial start-up processing shown in FIG. 4(a). In this initial start-up processing, as shown in the drawing, the mount priority calculation processing is started (step 402) and then the HDD mount processing is started (step 404). Each application is started up in accordance with the automatic start application definition (step 406) and the process ends.

In the automatic start application definition, the applications to be automatically started in starting up the data processing apparatus are registered. According to the present embodiment, the navigation application, the audio application and the telematics application are registered in the automatic start application definition.

The HDD mount processing that starts up in step 404 of the above-described initial start-up processing is now described.

FIG. 4(b) shows a procedure of the HDD mount processing. In this HDD mount processing, as shown in the drawing, each partition in the HDD 8 (steps 452 and 458) is successively and sequentially (step 456) mounted (step 454) as the logical drive in order of the priority (step 460) registered in the mount priority table.

With regard to the partition of a second or later priority, its mounting processing is performed in the HDD mount processing after mounting completion of the partition of its adjacent priority. In starting up the data processing apparatus, through the HDD mount processing, each partition in the HDD 8 is mounted as the logical drive in time order in accordance with the priorities that are registered in the mount priority table.

Next, the mount priority calculation processing that starts in step 402 of the initial start-up processing is described. The mount priority calculation processing is a processing for determining the priority of the logical drive corresponding to each partition in the HDD 8 and for registering the determined priority in the above-described mount priority table.

FIG. 5 shows a procedure of the mount priority calculation processing. As shown in the drawing, in this processing, until all the initial setting processings of the applications (applications registered in the automatic start application definition) which start up in step 406 of the initial start-up processing are completed (step 502), an occurrence of access to each logical volume by each application is monitored (step 504). If an access occurs, whether the application which is the origin of the access is in the course of the initial setting processing is examined (step 506). When the initial setting processing is completed in the application, the process returns directly to step 502. On the other hand, when the initial setting processing is not completed in the application, an occurrence of the access is registered in the access management table (step 508) and then the process returns to step 502.

The access management table is a table for registering the access frequency of each application to each logical drive as shown in FIG. 3(b). The access frequency of the application as access origin in the entry of the logical drive in which an access registered in the access management table occurs is incremented by 1 in step 508.

When all of the initial setting processings of the applications which are started in step 406 of the initial start-up processing are completed (step 502), the total number of the access frequency for each logical volume is found. The priority of each logical volume is determined such that the logical volume having a greater total number has higher priority. The determined priority of each logical volume is registered in the mount priority table stored in the SDRAM 6. At the same time, the mount priority table stored in the SDRAM 6 is rewritten in the flash memory 9 (step 510). Then, the mount priority calculation processing is completed.

The initial setting processing of each application means an initial setting processing which is performed in start-up by each application itself. Setting an initial state of the application, displaying an initial screen of the window used as the GUI by the application, and so forth are executed in the initial setting processing.

In the above-described mount priority calculation processing, whether the initial setting processing of each application is completed is identified as follows, for example. Each application is structured so as to notify the mount priority calculation processing of completion of the initial setting processing when the initial setting processing is completed. The completion of the initial setting processing of each application is identified in the mount priority calculation processing based on the notification. Alternatively, in the mount priority calculation processing, completion of the initial setting processing of the application may be identified when an initial screen display of the window used as the GUI by the application is completed or a user operation becomes available, as a result of monitoring completion of an initial screen display of the window used as the GUI by the application or the user operation available state in the application.

An example of the start operation of the data processing apparatus which is performed by the above-described processing is now described.

Assume that, in the start-up of the data processing apparatus the previous time, through the mount priority calculation processing, detected are access to the logical volumes #1, #4 and #5 in the initial setting processing by the navigation application in start-up, and access to the logical volumes #2 and #4 in the initial setting processing by the audio application and the telematics application in start-up, as shown in the access management table of FIG. 3(b). Assume that, in the start-up of the data processing apparatus the previous time, through the mount priority calculation processing, priorities of the logical volumes (partitions) are determined in the order of #1, #4, #5, #2 and #3 based on the total number of accesses to each logical volume of the access management table and the determined priorities are registered in the mount priority table as shown in FIG. 3(a).

Figures 6A, 6B:
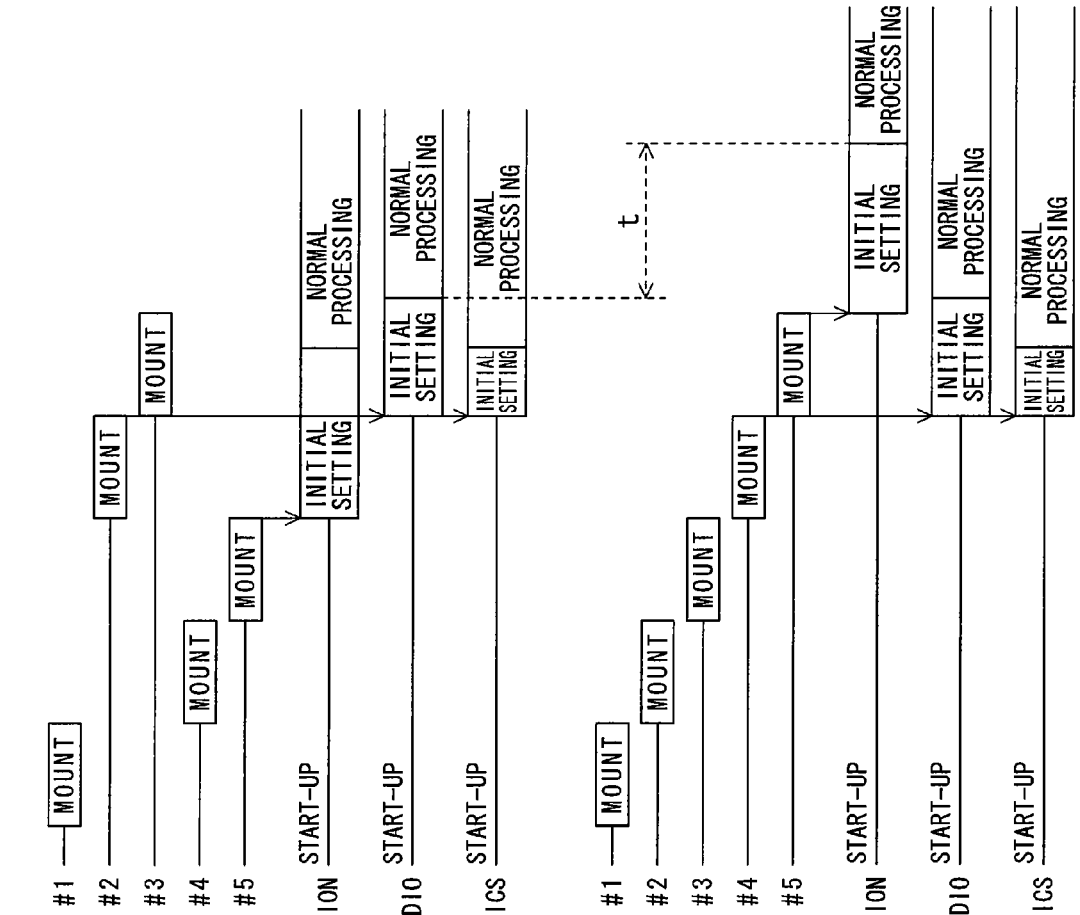
FIGS. 6(a) and 6(b) show examples of the start-up operation of the data processing apparatus according to the embodiment of the present invention.

In this case, when this data processing apparatus is started up, the logical volumes (partitions) are sequentially mounted in the order of #1, #4, #5, #2 and #3 through the HDD mount processing as shown in FIG. 6(a), in accordance with the priority registered in the mount priority table shown in FIG. 3(a).

Among the respective applications which are already started up by the initial start-up processing at this moment, the navigation application which accesses the logical volumes #1, #4 and #5 in the initial setting processing starts the initial setting processing at the latest when the mounting of the three logical volumes #1, #4 and #5 is completed. The audio application and the telematics application which access the logical volumes #2 and #4 in the initial setting processing start the initial setting processing at the latest when the mounting of four logical volumes #1, #4, #5 and #2 is completed.

As a comparative example, according to a conventional technology, a start-up operation is shown in FIG. 6(b) in a case where the logical volumes (partitions) are mounted in the ascending order of #1, #2, #3, #4 and #5.

In this case, the navigation application which needs to access the logical volumes #1, #4 and #5 in the initial setting processing cannot start the initial setting processing until the mounting of the five logical volumes #1, #2, #3, #4 and #5 is completed, as shown in the drawing. The audio application and the telematics application which need to access the logical volumes #2 and #4 in the initial setting processing cannot start the initial setting processing until the mounting of the four logical volumes #1, #2, #3 and #4 is completed. As a result, this processing according to the conventional technology requires a longer time "t" shown in the drawing for completing the initial setting processing of all the applications as compared with the present embodiment.

As understood by a comparison of FIGS. 6(a) and 6(b), the present embodiment reduces the time required for completing the start-up of the applications, compared with the conventional technology.

Preferred embodiments according to the present invention have been described above. Now, an alternative mount priority calculation processing of FIG. 5 is described.

In the mount priority calculating processing, a length of time required for completing the initial setting processing of each application is measured by means of the initial setting processing time length management table as shown in FIG. 3(c). When the initial setting processings for all the applications are completed (step 502), the process proceeds to step 522 of FIG. 5 in place of step 510, and the logical volume accessed by each application in the initial setting processing is found from the access management table. The priority of each logical volume is determined such that the logical volume accessed by the application having a longer time length required for completing the initial setting processing has higher priority. The priority of each of the determined logical volumes is registered in the mount priority table stored in the SDRAM 6, and at the same time, the mount priority table stored in the SDRAM 6 is written in the flash memory 9. Then, the mount priority calculation processing is completed.

In step 522, a sum of the length of time required for completing the initial setting processing of the application which accesses the logical volume in the initial setting processing is used, for example, as an evaluated value of each logical volume. The priority of each logical volume is determined such that a logical volume having a greater evaluated value has higher priority. Thereby, the priority of each logical volume is determined such that the logical volume accessed by the application having a longer time length required for completing the initial setting processing has higher priority.

The length of time required for completing the initial setting processing of each application may be found as a time required for completion of the initial setting processing from start-up of the application. However, it is more preferable that the length of time is found as a time required for completing the initial setting processing of the application from completion of all the mountings of the logical volumes accessed in the initial setting processing by the application.

By performing the mount priority calculation processing as described above, mounted earlier is the logical volume accessed in the initial setting processing by the application requiring a longer time for completing the initial setting processing. Accordingly, the application requiring a longer time for the initial setting processing can start the initial setting processing sooner. Therefore, the length of time required for completing the initial setting processings of all the applications to start-up is reduced.

Further alternative mount priority calculation processing of FIG. 5 is now described. When the initial setting processings of all the applications are completed (step 502), the process proceeds to step 532 of FIG. 5 in place of step 510. The priority of each logical volume is determined such that a logical volume accessed by the application which has been active later in the initial setting processing has higher priority. The priority of each of the determined logical volumes is registered in the mount priority table stored in the SDRAM 6, and at the same time, the mount priority table stored in the SDRAM 6 is written in the flash memory 9.

After that, every time when switching of an active application occurs (step 534), the process performs the processing of step 532. In step 532, the priority of each logical volume is determined such that the logical volume accessed by the application which has been active later in the initial setting processing has higher priority. First, the value 2 is added to the evaluated value of the logical volume accessed by the application which is active in the initial setting processing. Next, the value 1 is added to the evaluated value of the logical volume accessed by the application which has been active last time in the initial setting processing. The priority of each logical volume is thus determined such that the logical volume having greater evaluated value has higher priority.

It should be noted that "the active application" means an application which is in use, specifically, an application which is available to a user (GUI is active) by means of the operating system and so forth at the moment.

By performing the mount priority calculation processing as described above, the time required for completing the initial setting processing of the application previously used by a user to start-up the application is reduced. Accordingly, a user can use the application previously activated immediately after the start-up of the data processing apparatus.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A data processing apparatus for mounting a plurality of logical drives and executing an application using data stored in the logical drives, comprising:
   a priority setting section configured to set a priority of each logical drive such that a logical drive accessed by an application, which automatically started in the start-up of the data processing apparatus in the initial setting processing of the application, is assigned a higher priority based on access frequency; and
   a mounting processor configured to mount, in the start-up of the data processing apparatus, each logical drive in the order of the set priority.

2. The data processing apparatus according to claim 1, wherein:
   the plurality of logical drives comprises partitions of an HDD.

3. The data processing apparatus according to claim 1, wherein:
   the data processing apparatus is mounted in a vehicle; and
   the automatically started application includes an application for causing the data processing apparatus to function as a car navigation system.

4. The data processing apparatus according to claim 1, wherein:
   the priority setting section sets a priority of each logical drive such that a logical drive having higher access frequency by the automatically started application in the initial setting processing of the application has a higher priority.

5. The data processing apparatus according to claim 4, wherein:
   the plurality of logical drives comprises partitions of an HDD.

6. The data processing apparatus according to claim 4, wherein:
   the data processing apparatus is mounted in a vehicle; and
   the automatically started application includes an application for causing the data processing apparatus to function as a car navigation system.

7. A data processing apparatus for mounting a plurality of logical drives and executing an application using data stored in the logical drives, comprising:
   a priority setting section configured to set a priority of each logical drive such that a logical drive accessed by an application, which automatically started in the start-up of the data processing apparatus in the initial setting processing of the application, is assigned a higher priority based on a length of time required for the initial setting processing of the automatically started application, such that a logical drive accessed by an application requiring a longer time for the initial setting processing of the application has higher priority; and
   a mounting processor configured to mount, in the start-up of the data processing apparatus, each logical drive in the order of the set priority.

8. The data processing apparatus according to claim 7, wherein:
   the plurality of the logical drives comprises partitions of an HDD.

9. The data processing apparatus according to claim 7, wherein:
the data processing apparatus is mounted in a vehicle; and
the automatically started application includes an application for causing the data processing apparatus to function as a car navigation system.

10. A data processing apparatus for mounting a plurality of logical drives and executing an application using data stored in the logical drives, comprising:
a priority setting section configured to set a priority of each logical drive such that a logical drive accessed by an application, which automatically started in the start-up of the data processing apparatus in the initial setting processing of the application, is assigned a higher priority such that a logical drive accessed by the application last used by a user from among the automatically started applications in the initial setting processing has a higher priority than other drives; and
a mounting processor configured to mount, in the start-up of the data processing apparatus, each logical drive in the order of the set priority.

11. The data processing apparatus according to claim 10, wherein:
the plurality of the logical drives comprises partitions of an HDD.

12. The data processing apparatus according to claim 10, wherein:
the data processing apparatus is mounted in a vehicle; and
the automatically started application includes an application for causing the data processing apparatus to function as a car navigation system.

13. A method of mounting a plurality of logical drives of a data processing apparatus for executing an application using data stored in the logical drive, the method comprising:
setting a priority of each logical drive such that a logical drive accessed by an application, which automatically started in the start-up of the data processing apparatus in the initial setting processing of the application, has a higher priority based on access frequency; and
mounting each logical drive in the order of the set priority in the start-up of the data processing apparatus.

14. The method according to claim 13, wherein:
the priority of each logical drive is set such that the logical drive having higher access frequency by the automatically started application in the initial setting processing of the application has a higher priority.

15. A method of mounting a plurality of logical drives of a data processing apparatus for executing an application using data stored in the logical drive, the method comprising:
setting a priority of each logical drive such that a logical drive accessed by an application, which automatically started in the start-up of the data processing apparatus in the initial setting processing of the application, has a higher priority based on a length of time required for the initial setting processing of the automatically started application, such that a logical drive accessed by an application requiring longer time for initial setting processing in the initial setting processing of the application has a higher priority; and
mounting each logical drive in the order of the set priority in the start-up of the data processing apparatus.

16. A method of mounting a plurality of logical drives of a data processing apparatus for executing an application using data stored in the logical drive, the method comprising:
setting a priority of each logical drive such that a logical drive accessed by an application, which automatically started in the start-up of the data processing apparatus in the initial setting processing of the application, has a higher priority such that the logical drive accessed by the application last used by a user from among the automatically started applications in the initial setting processing has a higher priority than other drives; and
mounting each logical drive in the order of the set priority in the start-up of the data processing apparatus.

17. A non-transient computer-readable medium having computer-readable content to cause a computer program for a data processing system configured to mount a plurality of logical drives, to perform acts of:
executing an application using data stored in the logical drive;
setting a priority of each logical drive such that a logical drive accessed by an application automatically started in the start-up of the computer in the initial setting processing of the application has a higher priority based on access frequency; and
mounting each logical drive in order of the set priority in the start-up of the computer.

18. The non-transient computer-readable medium according to claim 17, further comprising computer-readable content to cause a computer to:
set a priority of each logical drive such that the logical drive having higher access frequency by an automatically started application in the initial setting processing of the application has a higher priority.

19. The non-transient computer-readable medium according to claim 17, further comprising computer-readable content to cause a computer to:
set a priority of each logical drive based on a length of time required for the initial setting processing of the automatically started application, such that the logical drive accessed by the application which requires a longer time for the initial setting processing of the application has a higher priority.

20. The non-transient computer-readable medium according to claim 17, further comprising computer-readable content to cause a computer to:
set a priority of each logical drive such that the logical drive accessed by the application last used by a user from among the automatically started applications in the initial setting processing of the applications has a higher priority than other logical drives.

* * * * *